United States Patent [19]

Cardenas-Franco et al.

[11] Patent Number: 4,708,729
[45] Date of Patent: Nov. 24, 1987

[54] ELECTRONIC SYSTEM FOR AUTOMATICALLY CONTROLLING THE WEIGHT AND THE SHAPE OF GLASS GOBS IN A MOLTEN GLASS FEEDER

[75] Inventors: Luis Cardenas-Franco, Las Brisas Montêrrey; Ricardo Lopez-Mota, Monterrey, both of Mexico

[73] Assignee: Vitro Tec Fideicomiso, Monterrey, Mexico

[21] Appl. No.: 930,313

[22] Filed: Nov. 12, 1986

[30] Foreign Application Priority Data

Nov. 14, 1985 [MX] Mexico ............................... 604

[51] Int. Cl.⁴ .............................................. C03B 9/28
[52] U.S. Cl. ........................................ 65/164; 65/160; 65/162; 65/163
[58] Field of Search .................. 65/164, 163, 162, 160

[56] References Cited

U.S. PATENT DOCUMENTS

| | | | |
|---|---|---|---|
| 3,846,107 | 11/1974 | Foster et al. | 65/164 |
| 4,162,909 | 7/1979 | Peters | 65/164 X |
| 4,205,973 | 6/1980 | Ryan | 65/164 X |
| 4,368,062 | 1/1983 | Mapes et al. | 65/163 X |
| 4,457,772 | 7/1984 | Haynes et al. | 65/164 X |
| 4,467,431 | 8/1984 | Gardner et al. | 65/163 X |
| 4,636,238 | 1/1987 | Sidler | 65/163 X |

FOREIGN PATENT DOCUMENTS 327134 4/1970 U.S.S.R. ................................ 65/164

Primary Examiner—Arthur Kellogg
Attorney, Agent, or Firm—Abelman Frayne Rezac & Schwab

[57] ABSTRACT

An electronic system for automatically controlling the weight and shape of glass gobs in a molten glass feeder. This electronic system continuously monitors the temperature, viscosity and level of the glass at the feeder bowl as well as the rotation and height of the tube with respect to the feeding orifice of the feeder, the reciprocating speed and stroke of the plunger inside the tube, the cutting speed of the glass gob shear blades, the shape of the gobs, and the weight of the finished articles through appropriate detectors which provide representative signals of the parameters that said detectors are respectively monitoring; a data processor that receives the data and processes same so as to compare the weight and form of the finished articles with their predetermined weight and shape and relate weight and shape deviations with the rest of the detected parameters to provide control signals to the tube mechanisms, plunger and shear blades which regulate the rotation speed and tube height, the reciprocation speed and plunger stroke and the shear speed of the blades in order to obtain the desired shape of the gobs and the desired, predetermined weight of the finished articles.

6 Claims, 3 Drawing Figures

ELECTRONIC SYSTEM FOR AUTOMATICALLY CONTROLLING THE WEIGHT AND THE SHAPE OF GLASS GOBS IN A MOLTEN GLASS FEEDER

FIELD OF THE INVENTION

The present invention is related to glass article manufacturing machines such as the ones that fabricate bottles. These machines are of the multiple section types as the one called I.S. or the rotatory type as the one known as Lynch, and, more specifically, it includes a molten glass feeder which forms glass gobs for machines such as the ones mentioned above and others that require this type of mechanism.

BACKGROUND OF THE INVENTION

The automatic manufacture of glass articles is carried out by means of glass forming machines such as the ones mentioned above and through forming processes known as the blow-blow, press-blow, or press types.

For the manufacture of articles it is necessary to feed molten glass gobs towards the machine. These molten glass gobs are obtained from a feeder which forms part of an glass melting furnace.

The feeder generally includes a feeder bowl defining an outlet spout; a plate having feeding orifices is placed adjacent to said spout, through which flows a discharge of molten glass; a rotating tube at the bowl aligned with the outlet spout and mounted on a mechanism that controls its rotation and height with respect to said outlet spout so that the glass can be not only homogenized at the feeder bowl but also to regulate the passage of the glass that falls towards the orifice plate; a reciprocating plunger inside the tube and aligned with the outlet spout. This plunger is mounted on a reciprocating mechanism which imparts and controls its speed and reciprocating stroke to push a predetermined quantity of glass towards the orifice plate; and a pair of reciprocating shear blades placed opposite to each other underneath the orifice and mounted on its respective reciprocating mechanism. These blades are used to cut the glass gobs from the current of glass flowing from the orifice.

Usually it is the tube that controls the amount of glass that should come out from the orifice to be cut by the blades. The latter is done in order to provide the weight of the glass gobs that is required to manufacture an article of predetermined weight.

However, it is not always possible to have the real weight of the article agree with the predetermined weight of same. This is due to lack of adjustment of the height of the tube which affects the weight of the gobs and of the articles, and to wear of the orifice, and variations in the level of glass, among others.

In order to achieve control over the weight of the gobs and the finished articles, the U.S. Pat. No. 2,306,789 describes an automatic electromechanical regulator that controls the weight of the gobs. This regulator includes a scale to weight the finished articles and provides a representative signal of the weight and elements that respond to same to operate an electric motor connected with the tube's mechanism in order to regulate the height of the tube with respect to the orifice.

After the mentioned patent, a series of other mechanisms made their appearance to control the height of the tube, such as those described in the U.S. Pat. Nos. 2,479,120 of M. K. Koleda; 3,239,326 of R. E. Tyner; and 3,874,866 of Iacovazzi et al, as well as diverse forms for weighing the finished articles of the glass gobs, such as those described by U.S. Pat. Nos. 3,846,107 of T. V. Foster et al; 4,339,028 of T. Meacle; and 4,165,975 of Kwiatkowski et al.

Trying to obtain a more precise control over the weight of the gobs and the articles, other control systems made their appearance. These systems detect the volume of the gob by means of photo-detecting cameras located at a 90 degrees angle, such as the one which is describe by U.S. Pat. No. 4,205,973 of W. H. Ryan.

However, even though you obtain better control over the height of the tube through measurement of its weight or volume, the problem of lack of adjustment in the weight of the gob persists. This is so because up to now the dynamic process of the system in the generation of movement of the tube was unknown nor had it been taken into consideration. The stated dynamic system in the generation of the tube's movement causes a strong tendency to destabilize the system's control.

The above had an inventor, I. Ayala, establish in his Mexican Patent Appln. Ser. No. 206,561 granted to the same sponsor as the sponsor of the present application, that the conditions that upset the desired weight of the glass gob are the following:

1. The temperature, homogeneity and viscocity of the molten glass;
2. The level of the glass in the feeder bowl which exerts a load on the orifice zone;
3. The wear of the orifice through which the glass flows comes out; and
4. The disarrangements in the tube mechanism.

In spite of the fact that said patent application request already took into account the dynamic of the system, the stated system had only been partially understood. For example, just as was discovered by the inventors of the present patent application, the speed of rotation of the tube not only has a relation with the homogenization of the glass inside the feeder bowl but it also provokes a phenomenon known as "Coriolis effect" which causes suctin through the formation of a spiral or vortex current making it necessary to take into account the stated tube rotation speed in addition to its height. Likewise, the viscosity and the temperature of the glass at the feeder bowl, in combination with the speed and stroke of the plunger within the tube and the speed of the shear blades, are the factors that intervene in the system's dynamics. In addition he also determined that the shape of the glass gobs also influence the system's dynamics which again was reflected in the appropriate shapping of the finished articles. It was found that the form of the gobs could be controlled, taking into account the additional factors previously mentioned, and through the control of rotation and height of the tube, the speed and stroke of the plunger, and the cutting speed of the blades.

Taking into account all of the formerly mentioned parameters, the inventors of the present patent application invented an electronic system that automatically controls both the weight and the shape of the glass gobs. This is done through a continous monitoring of the weight of the finished articles, the rotation speed and height of the tube with respect to the orifice, the speed and stroke of the reciprocating plunger, the temperature, the viscosity and level of the molten glass in the feeder bowl, the cutting speed of the blades that cut the gob, and the shape of the glass gobs. The stated monitoring of all of these factors is carried out through a data processor which compares the real weight of the finished articles with the predetermined weight of same and relates the weight deviations to the rotation speed and height of the tube, to the speed and stroke of the plunger, to the temperature, viscosity and level of the glass in the feeder bowl and to the cutting speed of the blades that cut the gob and to the shape of the gobs. It provides compensation signals on the speed and tube height to its respective mechanism to permit the passage of adequate glass weight between the stated tube and the orifice so as to achieve the predetermined weight and shape of the articles.

SUMMARY OF THE INVENTION

Therefore, is an object of the present invention is to provide an electronic system to automatically control the weight and shape of the glass gobs in a molten glass feeder which takes into account the total dynamic process of the feeding system in order to control the speed and height of the tube, the speed and stroke of the plunger, and the speed of the gob shear blades so that gobs and glass articles of the shape and weight required can be provided.

Likewise a principal object of the present invention is to provide an electronic system of the previously described type which continuously monitors the weight of the finished articles, compares it with the predetermined weight of the same, and relates the weight variations with all the parameters that intervene in the feeding system in order to effect adjustments and compensations in the speed and height of the tube, the speed and stroke of the plunger and the cutting speed of the gob shear blades in order to reach the predetermined weight and shape of the glass gobs and finished articles.

Still another principal object of the present invention is to provide an electronic system of the previously described nature which includes article weight detectors, of the speed and height of the tube, of the speed and stroke of the plunger, of the temperature, viscosity and level of the molten glass in the feeder bowl, of the speed of the gob shear blades and of the shape of the gobs, all of which provide representative signals of the variables detected; a data processing unit which receives and processes the signals provided by the detectors in order to provide synergetic signals which control and compensate the speed and height of the tube, the speed and stroke of the plunger and the cutting speed of the gob shear blades in order to achieve the predetermined weight and shape for the gobs and the finished articles; an operator panel connected to the data processing unit in order to provide and obtain information from said unit.

These and other objects and advantages of the present invention will become self evident to the experts in the field with the following detailed description of same which is provided for a specific modality of the unit with the understanding that the same has its only object to be illustrative of the invention but not restrictive to same.

DETAILED DESCRIPTION OF THE INVENTION

Now follows a description of the invention making reference to the accompanying drawing which will illustrate the description and on which the same numbers and symbols refer to the same parts of the figures shown.

Figure 1:
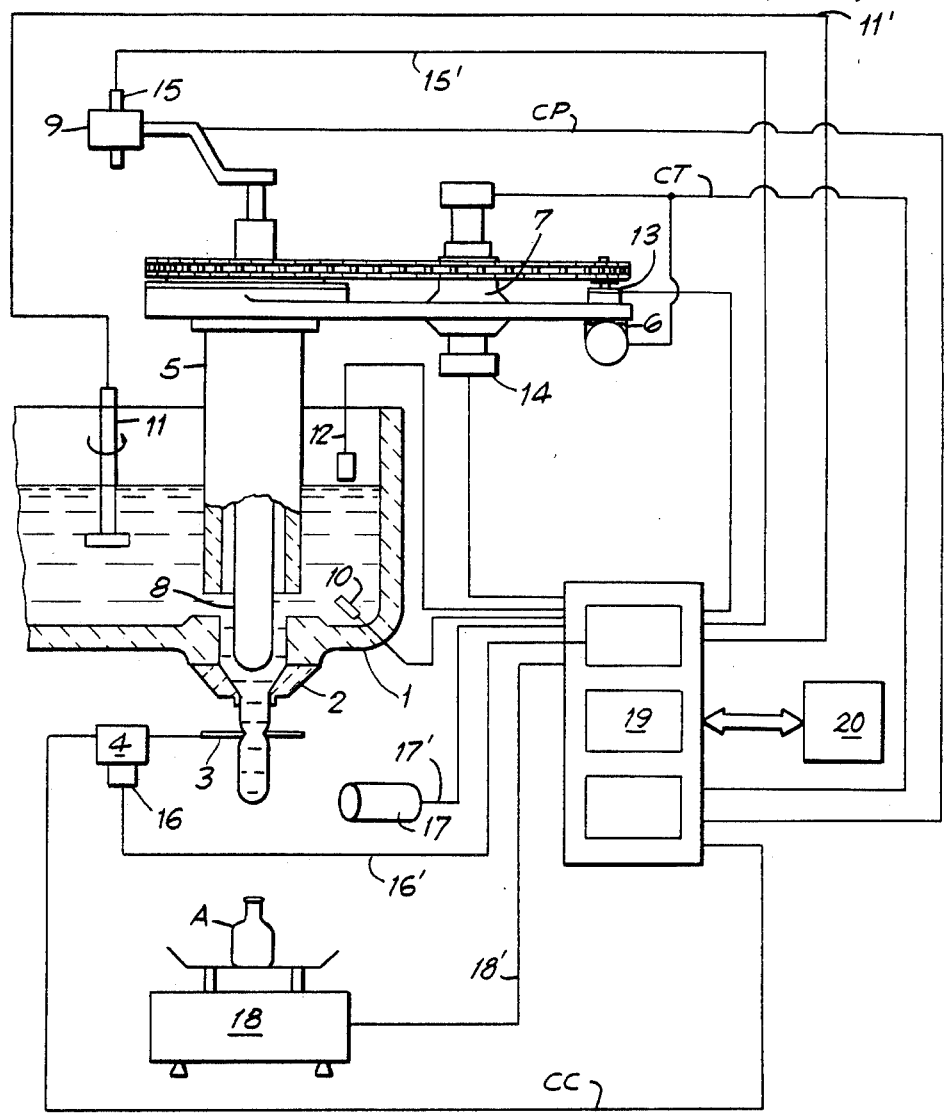
FIG. 1 is a diagram of the electronic system of the present invention that shows a transversal view of all of its components and the feeder.
Figure 2:
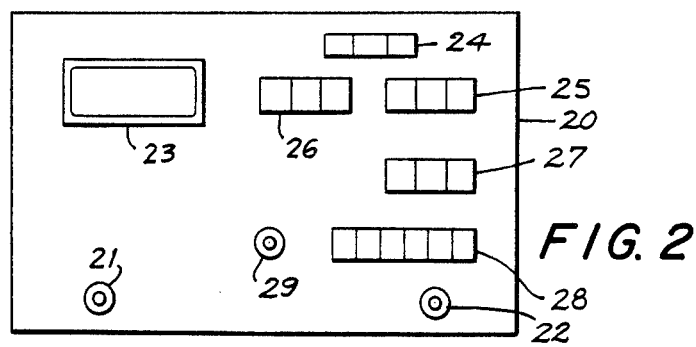
FIG. 2 is a schematic drawing of the operator panel that is associated with the data processing unit of the electronic control system of the present invention; it includes its control elements and the taking of data.

Making reference to FIG. 1, the molten glass feeder as is shown in the drawing generally includes a feeder bowl 1, which has a orifice-plate 2 at its bottom through which the glass flow exits which is to be cut into gobs by means of a pair of reciprocating shear blades placed under orifice-plate 2, and mounted on their respective reciprocating mechanism 4; a rotating tube 5 mounted on a mechanism 6 which makes it rotate in order to homogenize the molten glass in the feeder bowl 1 and which includes a mechanism 7 which varies its height with respect to the orifice-plate 2 in order to push the molten glass out through same thus providing a regulated flow current which is to be cut into gobs by the blades 3.

The system for automatically controlling the weight and shape of the glass gobs in a molten glass feeder such as the one described above and in agreement with the present invention includes the following:

At least one thermocouple 10 submerged in the feeder bowl 1, and a viscometer 11 and a level detector 12 at said feeder bowl 1 next to the orifice-plate 2 which provide representative signals of the temperature, viscosity and level of the molten glass in the feeder bowl 1; a speed detector 13, such as a tachometer or similar element, associated with mechanism 6 which makes the tube 5 turn and which provide representative signals of the rotation speed of the tube 5; a first position detector 14 located at the mechanism 7 of the tube 5 which provides representative signals with relation to the orifice 2 of the feeder bowl 1; a second position detector 15 connected to the reciprocating mechanism 9 of the reciprocating plunger 8 which provides representative signals of the reciprocating speed and the stroke of the plunger 8 in the inside of tube 5 and with relation to the orifice 2 of the feeder bowl 1; a second speed detector 16 connected to the mechanism 4 that activates the blades 3 placed reciprocally opposite to each other. The stated detector 9 provides representative signals of the blades' cutting speed 3; a set of optical fibers 17 placed underneath the cutting blades 3, which provides representative signals of the shape adopted by the gobs after having been cut by the stated blades 3; a weighing scale 18 located either at the cooling dead plates, (not shown) or to the side of the conveyor belt (not shown), which provides representative signals of the weight of the finished articles A; a data micro processor 19 which receives the signals from the detectors 10 to 18 through the respective lines 10' to 18' and processes the same in order to compare the real weight of the finished articles A with the predetermined weight of same and relate the weight deviations with the rest of the detected parameters in order to provide control signals to mechanisms 6 and 7 of tube 5, to mechanism 9 of the plunger 8 and to mechanism 4 of the shear blades 5 through the CT, CP and CC lines so that they regulate the rotation speed and height of the tube 5, the reciprocating speed and stroke of the plunger 8 and the speed of the shear blades 3 so that the desired shape of the glass gobs and the predetermined weight of the finished articles A are obtained.

It is desirable to have an operator panel 20 connected to the micro processor unit 19 in order to introduce, through it, the data on the weight and shape of the glass gob desired for the articles, as well as to provide and obtain information from the micro processor unit 19 having to do with the parameters that are being detected in the system or other data of the operation system of the machine. This operator panel 20 must contain at least one start switch 21 and a stop switch 22 in order to start and stop the system; a screen display 23 which presents the form adopted by the gob after having been cut; an indicator 24 of the temperature detected by the thermocouples 10; a Thumbwheel type indicator of time cycle 25 in order to provide and obtain the information of the operation cycle of the machine; an indicator of the viscosity data 26; a Thumbwheel type weight indicator 27 in order to obtain and provide information of the desired weight of the articles, and an indicator 28 for other parameters of the operation; these indicators can be operated or updated through an data-taking switch 29.

In order to operate the system, the operator provides, through switch 27, the desired weight for the articles, inserting the latter information into the numerical indicator of the stated switch 27. Likewise the machines operation data are inserted, such as the diameter of the article, the type of glass gob, the cutting speed per minute, etc., through the indicators 28 and the data taking switch 29 is activated. Once all of the data are inserted, the control shows the data of temperature average of the feeder bowl 1, the viscosity of the glass and the speed of the machine.

At the time that the start switch 21 is activated the system begins to shape gobs informing the operator of the shape of same on the screen 23 located on the control panel 20. The weight is retrofed to the system's control relating it with the real weight of the container provided by the scale 18.

In order to charge the speed of operation of the machine the corresponding data are inserted in the switchs of the control panel 20 in such a way that once the micro processing unit 19 has calculated the new profiles or its modifications, it goes on to effect the corrections to the corresponding mechanisms through its respective actuators.

Figure 3:
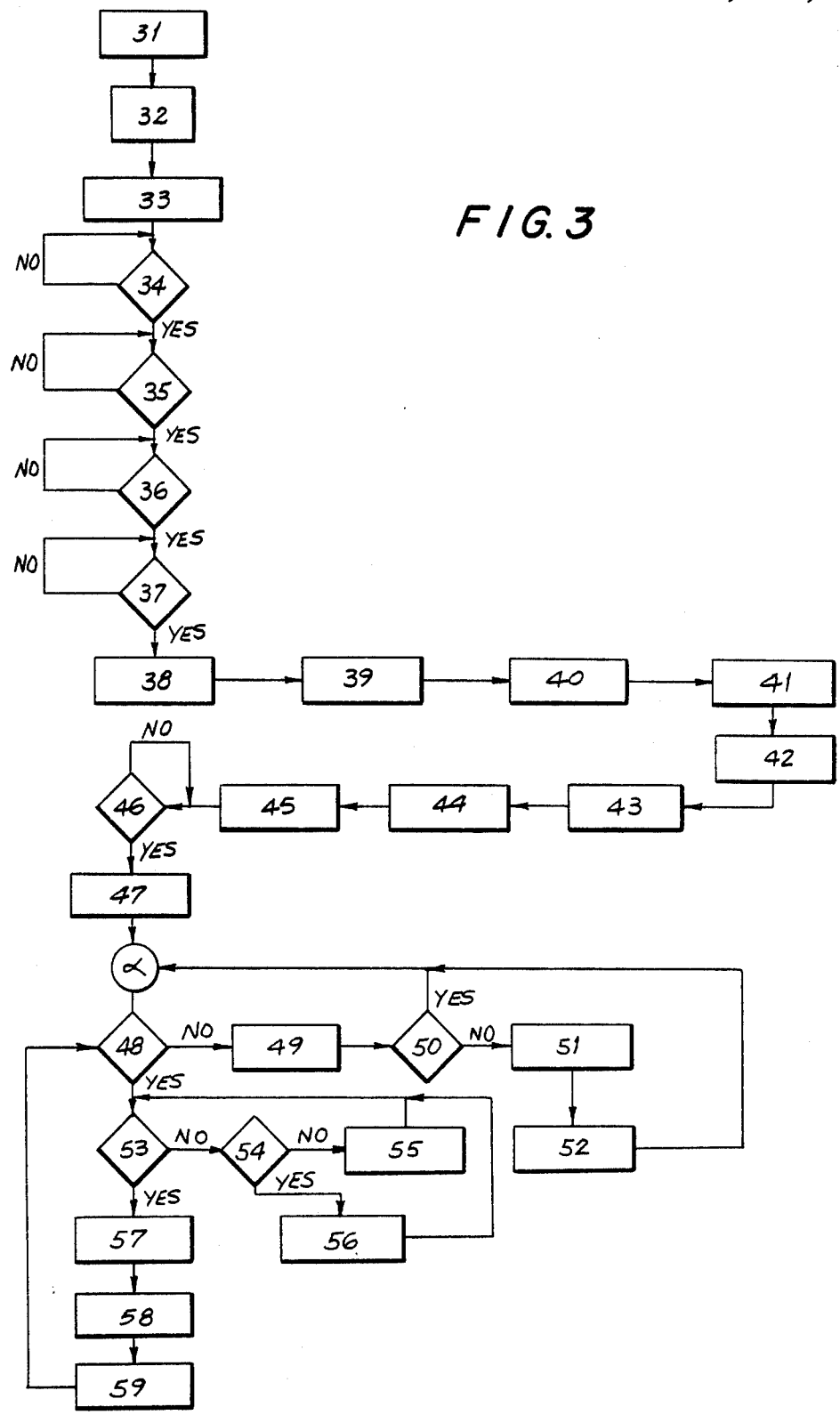
FIG. 3 is a flow diagram of the logic of the electronic control system of the present invention.

Now making reference to FIG. 3, the operation logic of the electronic control system of the present invention includes, in agreement with this flow diagram the following steps:

Start up of the system 31 through the activating of interruptor 21 located at the operator panel 20 in order to operate the data processing unit 19 as well as the entire system: the data processing unit 19 reads at step 32 the temperature, viscosity, tube height, glass level, etc., obtained from the respective sensors 10 to 18 and shows at step 33 the variables on the visual screen display of the operator control panel 20; at step 34 the data processing unit 19 checks if some data are already available and if not available it goes back through the "no" line to the start of this same step; and if it already has some data it goes through the "yes" line to the next step 35 to read the data of the type of gob (in other words, its weight, shape, etc.); and if it does not find the information it goes back through its "no" line to the start of the same step 35; if it locates the information on the type of gob it goes through its "yes" line to step 36 and the determination of the orifice's diameter; and if the information is not available it goes back through its "no" line to the start of its "yes" line to step 37 which is the reading of the weight of the article; if the information is not available it goes back to the start of the through its "yes" line to step 38 which is the selection of the speed profile of the tube 5 and it inmediately passes on to step 39 where the cutting time is calculated and on to step 40 to select the height of tube and on to step 41 to send the information to the feeding control mechanisms 4, 6, 7 and 9; next it goes on to the step 42 where it sends information to control 7 on the height of tube 5 and shows, at the step 43, the shape of the gob on the screen of the operator panel 20; at step 44 it shows the information on the speed and weight of the article on the visual screens of the operator control panel 20; next it goes on to step 45 where it checks the previous information with that contained on chips in the data processor memory 19 and at step 46 it effects start-up of the electronic control, but, if the system of start-up is not yet ready, it goes on to the beginning of its step through its "no" line, and if it is ready it goes through its "yes" line to step 47 where it intiates the formation of the gob; at step 48 a calculation takes place to find out if the shape of the gob is the one desired. If it is not the one expected, it goes through its "no" line to step 49 where a shape correction takes place through the tube control 5 in order to go on to step 50 to check if the weight is within the correct tolerances. If it is within the correct tolerances, it goes through its "yes" line to the start-up of step 48; but if it is not within the tolerances, it goes through the "no" line to step 51 which returns it to the previous limit through step 52 and it goes on to increase the cutting time. From here it returns to the start of step 48, and if at step 48 it is detected that the shape of the gob is not the one expected it goes to step 53 in order to determine if the weight of the gob is within its limits. If it is not within its limits it goes through its "no" line to step 54 to determine if more glass weight is needed. If at this step it is determined that more glass weight is needed, it goes through its "no" line to step 55 to increase the height of the tube 5 and from here it returns to step 53. If no more glass is needed, it goes through its "yes" line to step 56 in order to decrease the height of tube 5 and from here it goes to the start of step 53. If at the latter step it is determined that its weight is within its limits, it passes through its "yes" line to step 57 where the weight is indicated at the display on the operator control panel 20 and to step 58 where the variables are checked and shown on the control panel 20 where the weight and shape is checked at step 59 and from there return again to step 58.

It is worth-while to mention that in the above description of the invention reference is made to a single specific modality of same; for example, the invention is described in relation to feeders of a signle gob; however, it is evident that the invention could refer to one that feeds multiple gobs and for this result you simply have to multiply the diverse components of the feeding mechanism. Therefore, it is evident that the above description is provided only as a means of illustration, but that experts in the field can make changes both in the design and arrangement of the elements of the system which are included in the true spirit and scope of the invention which makes the following claims:

We claim:

1. An electronic system to automatically control the weight and shape of glass gobs in a molten glass feeder, of the type that includes a glass feeder bowl which has at least one feeding orifice; a rotating tube at the feeder bowl, aligned with the orifice, and mounted in a mechanism that controls its rotation and height with respect to the orifice in order to homogenize the glass in the feeder bowl and regulate the passage of the glass towards the orifice; at least a reciprocating plunger in the tube and aligned with the orifice, mounted on a reciprocating mechanism which provides and controls its reciprocating movement in order to push out a predetermined amount of glass towards the orifice; and at least one pair of reciprocating shear blades placed opposite to each other, underneath the orifice, and mounted on a reciprocating mechanism in order to cut glass gobs from the flow that comes out of the orifice and wherein the system comprise: a weight detector that provides a representative signal of the weight of the finished article; viscosity, temperature and glass level detectors at the feeder bowl which provide representative signals of the viscosity, temperature and glass level, respectively; glass gob cutting and glass gob image detectors next to the shear blades that provide representative signals at the moment of cutting and an image of the cut gobs; position detectors of the tube and the plunger that provide representative signals of the rotation speed and height of the tube with respect to the orifice and of the speed and reciprocating stroke of the plunger; a data processing unit which receives and processes the signals from the detectors in order to compare the weight of the finished articles with the predetermined weight of the same and relates the weight and glass gob shape deviations with the viscosity, temperature and level of the glass in the feeder bowl and with the cutting speed, speed and height of the tube, speed and stroke of the plunger and shape of the gobs in order to provide compensation signals to the mechanisms of the tube, plunger and shear blades so as to obtain the shape of the gob and the predetermined weight of the articles.

2. The electronic system of the claim 1, wherein the weight detector is a scale located to one side of the finished article conveyor belt.

3. The electronic system of the claim 1, wherein the temperature detectors are thermocouples located next to the orifice, at the feeder bowl.

4. The electronic system of the claim 1, wherein the glass gob shape detectors include optic fibers through which the shape of the gobs is obtained.

5. The electronic system of the claim 1, wherein the data processing unit includes an operator control panel, interconnected with the data processing unit so as to provide and obtain information from the processing unit whose panel includes a plurality of switchs and displays that provide and take information from the processing unit and a screen with a measuring framework that captures the shape of the gobs.

6. The electronic system of the claim 1, wherein the data processor is a micro computer.

* * * * *